United States Patent Office 2,862,124
Patented Nov. 25, 1958

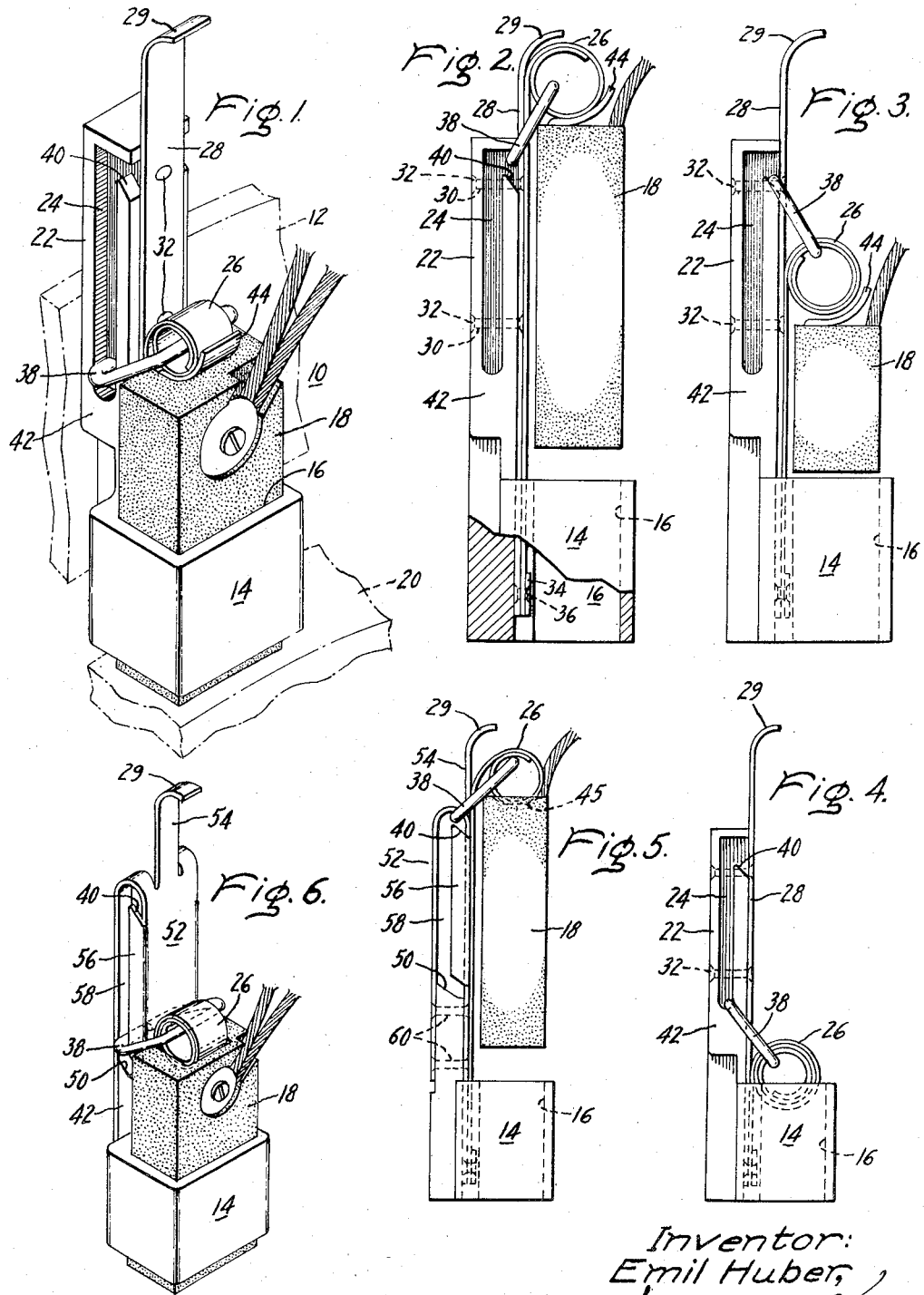

2,862,124

BRUSH HOLDER FOR DYNAMOELECTRIC MACHINES

Emil Huber, Scotia, N. Y., assignor to General Electric Company, a corporation of New York Application June 3, 1957, Serial No. 663,280

6 Claims. (Cl. 310—246)

The invention described herein relates to dynamoelectric machines and more particularly to an improved brush holder adapted for use with both alternating and direct current motors and generators, and has for its object the provision of a simple, safe and inexpensive brush holder capable of permitting the speedy change of carbon brushes therein and incorporating stop and spring holding features for precluding unwanted contact of metallic parts with the machine current collecting surface.

Brush holders of the prior art are designed in a manner requiring the periodic adjustment of tension in a biasing spring utilized in urging the brush into contact with the collector ring or commutator so as to supply a substantially constant pressure of predetermined force on the brush throughout its life. Such adjustment is preferably made at least once per month in order to provide an average brush pressure consistent with economical brush wear rates and proper operation of the machine. Since the spring pressure must be adjusted at relatively frequent intervals, a worker is apt to increase the pressure in an amount greater than normal so as to decrease the time associated with making this adjustment. Such action accelerates unduly the speed at which the brush wears and in the event it is worn beyond an acceptable length, the metallic rivets and other shunt holding metallic parts are likely to engage the current collecting surface and score it to a point of destruction. Further, in the event the spring breaks during machine operation, no means are provided for preventing it from falling into contact with the rotating parts of the machine.

I eliminate the above-described disadvantages of prior brush holders by utilizing a constant tension spring capable of automatically exerting the exact amount of pressure on the brush throughout its life. By a novel arrangement of a spring holding link, an operator can change the brushes with one hand thereby imparting a safety feature to the brush holder. As described hereinafter, the construction eliminates the possibility of brushes wearing to a point where the collector ring or commutator can be damaged by metal parts attached to the brush and provision is also made for holding loose parts of the biasing spring in the event of accidental or inadvertent breakage.

In carrying out my invention, I adapt available brush holders for use with dynamoelectric machines by providing a pair of oppositely disposed slots in the brush holder body of a size capable of accepting a link arranged to slide therein and loosely hold a coiled spring used in urging the brush into contact with the current collecting surface. Stops are provided at the opposite ends of the brush holder body for respectively holding a coiled spring out of contact with a brush and for preventing the application of pressure by the spring on the brush after the brush has reached a predetermined minimum point of wear.

While the specification concludes with claims particularly pointing out and distinctly claiming the subject matter which I regard as my invention, it is believed the invention will be better understood from the following description taken in connection with the accompanying drawing in which:

Figure 1 is a perspective view of the improved brush holder showing the disposition and location of parts when in an operative position;

Figure 2 is a side view of the brush holder shown in Figure 1 illustrating the arrangement of the parts prior to sliding a brush into a collector ring engaging position;

Figure 3 shows how the spring supporting link is held on the casing during removal of a worn brush;

Figure 4 illustrates the stop arrangement used in limiting the extent of downward movement of a spring in the brush holder;

Figure 5 is a side view of a modification illustrating the arrangement of parts prior to inserting a new brush in the brush holder; and Figure 6 is a perspective view of the modification shown in Figure 5 showing the parts in an operative position.

Referring now to the drawing wherein like reference characters designate like or corresponding parts throughout the several views, there is shown in Figures 1 through 4 a brush holder assembly 10 arranged for mounting on a bus bar 12 and consisting of a body 14 having an opening 16 for receiving a carbon brush 18 arranged for contact with the collector ring 20. While a collector ring is illustrated in the drawing, it will be apparent that the teachings disclosed herein are equally applicable to other current collecting surfaces, such as a commutator. An upstanding guide member 22 is integrally formed with the body 14 of the brush holder and is provided with a pair of oppositely disposed slots or grooves 24.

In order to provide means for supporting a constant tension spring 26 in the brush holder, a strap 28 is anchored at a plurality of points 30 to the brush holder body by rivets 32 or similar securing means. The coil spring 26 is of a type capable of exerting a predetermined pressure on a brush regardless of the extent to which it is rolled when in an operative position in the brush holder. Any suitable means may be employed for attaching the lower end of the spring to strap 28, and in the embodiment disclosed, a plate 34 and rivets 36 are used for this purpose. To prevent the spring from being accidentally bent in a reverse direction and across the upper end of strap 28, the latter is curved inwardly, as indicated at 29, in a manner to overlie the brush thus precluding spring breakage for this reason.

As illustrated in each of these figures, a line 38 consisting of a U-shaped member having its free ends turned toward each other, is arranged to extend axially through the coil spring 26 and its free ends are of a size to fit within the grooves 24 provided on opposite sides of the brush holder body. The upper end of the guide member is provided with a cutout portion to form a seat 40 for receiving the link free ends as shown in Figure 3. The bottom of the guide member 22 is furnished with a section of thick material which constitutes a stop member 42 that serves as a limit on the downward movement of link 38 and therefore the coiled spring 26 in the brush holder body as shown in Figure 4. It will be evident that the construction permits the link to move unimpeded in the grooves 24 during the time required for the brush to wear from a maximum to a minimum length.

In operation, when it is desired to insert a brush in the brush holder body, link 38, with its contained brush spring 26, is moved to the position where its free ends rest on the seat 40, as shown in Figure 3. The brush 18 is then manually placed beneath the coil spring and a plate 44 on the brush is adapted to engage the underside of the spring, thus urging the spring upwardly to the position shown in Figure 2 to allow the lower end of the brush to assume a position over the opening 16 provided in the brush holder body. Manual movement of the free ends of link 38 off seat 40 then permits the spring to apply its full pressure on the brush for urging the latter into contact with the collector ring 20, the parts thus assuming the position shown in Figure 1. During the time required for the brush to wear from a maximum to a minimum length, the link 38, in effect, floats on the brush holder and gradually drops in grooves 24 until it reaches the lowest position possible, as illustrated in Figure 4. In order to prevent the spring 26 from over-riding the top of the brush or from twisting thereon in a manner to exert a component of force other than that desired, the plate 44 is curved at an angle compatible with that formed by the volute of the spring when in a coiled position. In effect, the plate 44 serves as a cradle for the spring during machine operation.

If the brush is not renewed at this time, the link hangs up on the stop 42 and prevents the spring from exerting pressure on the top surface of the brush, thus precluding further wear of the brush. The desirable effect achieved by this construction is that the metallic parts of the brush cannot contact the collector surface and subsequent scoring or destruction thereof is eliminated. Also, in the event of spring breakage, the link 38 will hold the broken part of the spring, as is evident from the drawings, while the other part thereof will remain firmly attached to strap 28. This likewise protects the collector ring 20 or other rotating parts of the machine from being damaged until appropriate replacement can be made. When it is desired to remove the brush, link 38 may manually be moved to the position shown in Figure 3 wherein the link ends contact the seat 40. The brush is then urged against the bottom side of the spring volute, thus uncoiling the spring as the brush is moved upwardly in the brush holder. When the lower end of the brush is free of the top of opening 16, removal thereof is easily accomplished.

Referring now to the modification shown in Figures 5 and 6, it will be seen that the structure is similar to that disclosed above, but instead of providing a complete casting for the brush holder, a prefabricated part is substituted for the guide member 22 and attached to the brush holder body 14 for holding the slidable link 38. The major portion of the brush holder body having the brush receiving opening 16 in the same as that described in the previous modification except that it terminates a slight distance above the body as indicated at 50. A guide member 52 is attached to the body and consists of a stamped punching bent in the shape of a U and is provided with an upstanding member 54 carved out of the body of the punching and bent inwardly at 29 to overlie the brush for limiting upward and backward movement of the spring. Ends 56 are turned inwardly to form a seat 40 and grooves 58 in which the ends of link 38 are adapted to ride as in the manner previously described. This guide member is attached to the upstanding portion 50 of the brush holder by means of rivets 60 or similar securing means. In order to limit the extent of downward movement of link 38 in the brush holder, the upstanding member 50 forms the stop 42 by terminating at a point just sufficient to permit the link with its attached spring to lose contact with the brush when it has worn to the predetermined minimum length. The function served is therefore the same as that of stop 42 in the previous modification. The operation of the brush holder is the same as that described above in that the link 38 is moved to a position for engaging the seat 40 during the time that a brush is being inserted or removed. At all other times the link 38 assumes the position shown in Figure 6. In lieu of providing plate 44 on top of the brush, a cavity 45 of a size sufficient to receive the spring is formed therein to prevent twisting and overriding on the brush.

In view of the above, it is evident that many modifications and variations are possible in light of the above teachings. The principal concepts disclosed herein are that of providing a member, such as the link 38, movable on a brush holder and capable of holding a brush spring out of contact with the brush after it has worn to a minimum length. By providing seat and stop members at opposite ends of the guides, the spring may be placed in a position to permit safe and ready insertion and removal of a brush and also is capable of retaining the spring in the event of breakage. It therefore is to be understood that within the scope of the appended claims, the invention may be practiced otherwise than as specifically described.

What I claim as new and desire to secure by Letters Patent of the United States is:

1. A brush holder for use in a dynamoelectric machine comprising a body having an opening therein for receiving a carbon brush adapted for contact with a current collector for said machine, an upstanding guide member on said body having oppositely disposed grooves for receiving a movable member arranged to slide therein, a spring anchored at one end on said holder and having its free end engaged by said movable member and arranged for contact with the upper surface of said brush for urging it into contact with said current collector, and stop means provided on said body for limiting the extent of downward movement of said spring.

2. A brush holder for use in a dynamoelectric machine comprising a body having an opening therein for receiving a carbon brush, an upstanding member connected with said body, a spring attached at one end in said body and arranged to lie in a plane parallel with said upstanding member for contacting said brush and urging it into contact with a current collecting device, guide means on said upstanding member positioned for contact by a movable member engageable with said spring for facilitating the insertion and removal of a brush and for limiting the degree of downward movement thereby precluding wear of said brush past a predetermined point.

3. A brush holder for use in a dynamoelectric machine comprising a body having an opening therein for receiving a carbon brush, a prefabricated member attached to said body and having a longitudinal groove therein for receiving the free ends of a movable member, a coiled spring attached to said body and arranged to exert pressure on said brush, said spring being engageable by said movable member to limit the degree of downward travel of said spring and to retain the same in the event of breakage thereof during operation of said machine.

4. The combination according to claim 1 wherein a strap is firmly attached to said guide member and the spring is secured to said strap.

5. A brush holder for use with a dynamoelectric machine comprising a body having an opening therein for receiving a carbon brush, a guide member firmly attached to said body, a coiled spring connected at one end to the guide member and terminating at its other end in a volute adapted to urge a brush into contact with a current collecting surface, a link slidably mounted on the guide member and shaped to a configuration to have a portion thereof extend through the spring volute, and stop means on one end of said guide member for limiting the extent of downward movement of the link and the spring thereby to control the degree of wear of the brush.

6. The combination according to claim 5 wherein a seat engageable by the link is formed on the other end of the guide member for holding the spring in a retracted position during a brush replacement operation.

References Cited in the file of this patent

FOREIGN PATENTS 539,717     Germany _____ Dec. 4, 1931